(12) United States Patent
Hultqvist et al.

(10) Patent No.: US 11,934,164 B2
(45) Date of Patent: Mar. 19, 2024

(54) REMOTE RESETTING TO FACTORY DEFAULT SETTINGS; A METHOD AND A DEVICE

(71) Applicant: Axis AB, Lund (SE)

(72) Inventors: Sebastian Hultqvist, Lund (SE); Axel Keskikangas, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/336,992

(22) Filed: Jun. 2, 2021

(65) Prior Publication Data
US 2021/0405601 A1 Dec. 30, 2021

(30) Foreign Application Priority Data
Jun. 24, 2020 (EP) .................................... 20181999

(51) Int. Cl.
*G05B 19/042* (2006.01)
*H04L 9/32* (2006.01)

(52) U.S. Cl.
CPC .......... *G05B 19/042* (2013.01); *H04L 9/3271* (2013.01); *G05B 2219/23193* (2013.01)

(58) Field of Classification Search
CPC ..... H04L 9/3271; H04L 9/0877; H04L 12/12; H04L 41/0813; H04L 9/3247; G06F 21/57
See application file for complete search history.

(56) References Cited

U.S. PATENT DOCUMENTS

| | | | | |
|---|---|---|---|---|
| 5,914,971 A | * | 6/1999 | Carter ....................... | H04L 1/08 714/822 |
| 8,165,016 B2 | * | 4/2012 | Bamba .................... | H04L 45/24 370/228 |
| 8,453,222 B1 | * | 5/2013 | Newstadt ............... | H04L 63/083 726/4 |
| 10,218,697 B2 | * | 2/2019 | Cockerill .............. | H04L 63/083 |

(Continued)

FOREIGN PATENT DOCUMENTS

| | | |
|---|---|---|
| CN | 107800563 A | 3/2018 |
| EP | 3291121 A1 | 3/2018 |

OTHER PUBLICATIONS

TPM-based remote attestation for Wireless Sensor Networks, Fu et al, Jun. 2016. (Year: 2016).*

(Continued)

*Primary Examiner* — Jahangir Kabir
(74) *Attorney, Agent, or Firm* — Volpe Koenig

(57) ABSTRACT

A method, implemented in a device, for remote resetting of the device to factory default settings, the device comprising an electric circuit adapted to carry out the factory default reset and a secure processing and storage environment, SPSE, the method comprising: receiving, at the SPSE, a request to reset the device to factory default settings and a challenge associated with the request, wherein the request and the challenge are received via a network; initiating, by the SPSE, a reset to factory default settings of the device by communicating with the electric circuit via a communication channel; and sending, by the SPSE, a confirmation via the network, wherein the confirmation includes a response to the challenge as produced by the SPSE and an attestation report, the attestation report being a declaration by the SPSE that the reset to factory default settings is initiated or carried out.

17 Claims, 5 Drawing Sheets

(56) References Cited

U.S. PATENT DOCUMENTS

| | | | |
|---|---|---|---|
| 10,496,851 B1* | 12/2019 | Oggioni | G06F 21/76 |
| 10,902,307 B1* | 1/2021 | Milner | G06K 19/0701 |
| 2012/0159586 A1* | 6/2012 | Carney | H04L 63/105 |
| | | | 726/5 |
| 2013/0117565 A1 | 5/2013 | He | |
| 2016/0080379 A1 | 3/2016 | Saboori et al. | |
| 2016/0099950 A1* | 4/2016 | Cuff | H04L 63/12 |
| | | | 726/7 |
| 2016/0255063 A1 | 9/2016 | Zhang et al. | |
| 2017/0337390 A1 | 11/2017 | Hamilton et al. | |
| 2018/0063156 A1* | 3/2018 | Hugosson | H04L 63/108 |
| 2018/0096174 A1 | 4/2018 | Finger et al. | |

OTHER PUBLICATIONS

Chinese Office Action dated May 9, 2022 for Chinese Patent Application No. 202110684505.4.

* cited by examiner

REMOTE RESETTING TO FACTORY DEFAULT SETTINGS; A METHOD AND A DEVICE

TECHNICAL FIELD

The present invention relates, in general, to remote resetting of a device to factory default settings.

BACKGROUND

Electronic devices are often configured such that they may be reset to factory default settings if needed. When the device is reset to factory default settings it may function, in at least some respects, as when it left the factory it was produced in. The reset may remove data, settings and applications from the device. If the device is controlled by an attacker, a reset to factory default settings may restore the independence of the device. The resetting of the device to factory default settings may be initiated locally, at the device, e.g., by physically pushing a button; or remotely, e.g., by sending a message to the device which instructs the device to reset to factory default settings. The resetting of the device to factory default settings may comprise powering the device off and on again followed by rebooting the device in a state of factory default settings. There are many different ways to implement a reset to factory default settings. However, there is still room for improvements.

SUMMARY

Enabling secure remote resetting of devices, and in particular enabling cost effective resetting of devices are at least partly met by the description set forth hereinafter and the concepts as defined in the independent claims. Preferred embodiments are set out in the dependent claims.

According to a first aspect, there is provided a method, implemented in a device, for remote resetting of a device to factory default settings, the device comprising an electric circuit adapted to carry out the factory default reset and a secure processing and storage environment, SPSE, the SPSE being configured for communicating with at least one remote unit via a network, and for communicating with the electric circuit via a communication channel, the method comprising:

receiving, at the SPSE, a request to reset the device to factory default settings and a challenge associated with the request, wherein the request and the challenge are received via the network;

initiating, by the SPSE, a reset to factory default settings of the device by communicating with the electric circuit via the communication channel; and sending, by the SPSE, a confirmation via the network, wherein the confirmation includes a response to the challenge as produced by the SPSE and an attestation report, the attestation report being a declaration by the SPSE that the reset to factory default settings is initiated or carried out.

The method enables secure remote resetting of a device. The method will in the following be described, by way of example, with the device being a network video camera. However, the method is of course applicable to any device capable of communicating over a network.

In case a device is under the control of an attacker, e.g., has been infected with malware by the attacker, the attacker may try to prevent a factory default reset. Further, if the device is asked to confirm that the factory default reset has been performed, the attacker may try to forge a confirmation in order to stay undetected. The method may prevent or obstruct forging of the confirmation, thereby enabling secure remote resetting of the device. Secure remote resetting of devices, such as network video cameras, may be important to prevent them from being controlled by an attacker for an extended period of time.

A reset to factory default settings of the device may comprise turning the power to part of the device off and on again. The part of the device may be a first circuit. Dependent on the request the first circuit may be booted into a state of factory default settings when the power comes on again.

The SPSE may be a part of the device configured prevent or obstruct unauthorized behavior. Thus, the SPSE may be a tamper resistant part of the device. In particular, the SPSE may be a part of the device configured to enforce truthfulness in the communication from the SPSE to the at least one remote unit. Thus, the remote unit may trust that the attestation report of the confirmation is correct and that the device is indeed being reset or has been reset to factory default settings. The remote unit may trust that the attestation report of the confirmation is not produced by an attacker.

The response to the challenge may be a response indicating that the confirmation, including the attestation report, is a current confirmation. When the attacker is not able to convincingly forge a confirmation, the attacker may try to resend an old confirmation. If a challenge is never, or rarely, repeated, and if each challenge has its own specific response; the remote unit may trust that if the confirmation comprises the correct response to the challenge associated with the current request to reset the device to factory default settings, the confirmation is also a confirmation relating to the current request to reset the device to factory default and not to an old request to reset the device to factory default. The remote unit may trust that the confirmation, with the included attestation report, is not a replay of an outdated confirmation.

In accordance with the above, the method enables secure remote resetting of the device to factory default settings. The confirmation may attest that the reset to factory default settings is carried out, in which case it can be trusted that the device is indeed reset. The confirmation may attest that the reset to factory default settings has been initiated, in which case it can be trusted that the device is very likely to be reset. It is possible to implement the reset process such that it is very hard for the attacker to stop it once it has been initiated. When no confirmation report is received by the remote unit or if the response to the challenge is incorrect, this may be taken as an indication of the device being corrupted by an attacker. A service technician may then be sent to reset the device on location.

The method further enables cost effective resetting of devices. Devices may be reset remotely with the method. As a service technician only needs to go to a device on occasions when there is an indication of the device being corrupted by an attacker, cost may be saved in terms of staff, travel time, and travel expenses. For example, if the device is a network video camera, e.g., overviewing a traffic intersection from the top of a street light, it may be associated with a fair amount of cost to send a service technician with a mobile elevating work platform to reset the device.

The SPSE may be a secure element. The SPSE may be a trusted system, e.g., a Trusted Platform Module (TPM). The SPSE may have enhanced security compared to the rest of the device. The SPSE may comprise curtained memory that defines the behavior of the SPSE, wherein the curtained memory is shielded from influence from entities outside the SPSE. The SPSE may comprise a cryptographic key, wherein the SPSE is configured to digitally sign information using a cryptographic key. Information signed using the cryptographic key may be authenticated as coming from the SPSE. The cryptographic key may be stored in the curtained memory.

The SPSE may be one or more dedicated chips, separate from other chips in the device, e.g., a discrete TPM. Alternatively, the SPSE may be part of a chip wherein the rest of the chip has a lower or no security enhancement, such as e.g., an integrated TPM. Alternatively, the SPSE may be a piece of software that run in a trusted execution environment of a processor, such as e.g., a firmware TPM. By not making the entire device a secure processing and storage environment cost may be saved. The SPSE may be dimensioned only for the most critical tasks of the device. Other tasks may be handled by cheaper chips. The SPSE may e.g., be configured to only handle operations relating to receiving the request and the challenge, initiating the reset to factory default settings, and sending the confirmation via the network. The SPSE may alternatively of course also be configured to handle other tasks. For example, in the case of the device being a network video camera the SPSE may further handle tasks relating to the content of the videos being recorded, e.g., transmitting the video recordings in an encrypted format. Non-critical tasks may be entrusted to chips not comprised by the SPSE.

The electric circuit may comprise a register which controls if a reset to factory default settings should be made. When the SPSE initiates the reset to factory default settings of the device by communicating with the electric circuit via the communication channel it may communicate with the register of the electric circuit. The communication channel may be a bus or a wire connecting the SPSE with the electric circuit.

The SPSE may receive and send information via the network in accordance with the application protocol data unit (APDU) protocol. When the SPSE initiates the reset to factory default settings of the device by communicating with the electric circuit via the communication channel, the communication may be in accordance with a protocol different from the APDU protocol, e.g., the inter-integrated circuit (I2C) protocol.

The confirmation may, in addition to the response and the attestation report comprise further information. For example, the confirmation may comprise an identifier, e.g., an ID or serial number of the device or of the SPSE of the device. Further, the confirmation may comprise at least one time, e.g., the time the request was received by the SPSE, the time the challenge was received by the SPSE, the time the reset to factory default settings was initiated, the time the confirmation was sent. An identifier or a time comprised in the confirmation may be comprised in the attestation report of the confirmation or elsewhere in the confirmation. The response to the challenge and the attestation report may be separate parts of the confirmation. Alternatively, the response to the challenge may be comprised in the attestation report.

The method may further comprise:
including, by the SPSE, a declaration in the attestation report that the SPSE has initiated a process of writing a reset command to the electric circuit via the communication channel, the reset command being a command prompting the electric circuit to carry out the factory default reset.

Such a declaration may be considered to prove that the SPSE has received the request correctly, i.e., that the attacker has not intercepted the request and modified it before it entered the SPSE, and that the SPSE has started acting on the request. Thus, the remote unit may trust, with a high level of certainty, that the reset to factory default settings will commence shortly.

The SPSE may initiate a process of writing a reset command to the electric circuit by initiating a transfer of information, relating to the reset command, via the communication channel or by placing the reset command in a que of messages that the SPSE will write to the electric circuit.

The method may further comprise:
checking, by the SPSE, that a reset command has been received by the electric circuit, the reset command being a command prompting the electric circuit to carry out the factory default reset, the reset command being a command written by the SPSE to the electric circuit via the communication channel;
including, by the SPSE, a declaration in the attestation report that the SPSE has checked that the reset command has been received by the electric circuit.

Such a declaration may be considered to prove that the electric circuit has received the request correctly, i.e., that the attacker has not intercepted and modified the reset command as it is being written by the SPSE. Thus, the remote unit may trust, with a very high level of certainty, that the reset to factory default settings will commence shortly.

In principle it should be possible to configure the device such that once the SPSE has started writing the reset command to the electric circuit, the execution of the command cannot be stopped by the attacker. However, it may be hard to know that every loophole the attacker may exploit has been closed. With this in mind; the probability that the reset command will be executed may be considered higher when the remote unit receives a declaration that the SPSE has checked that the reset command has been received by the electric circuit than when the remote unite only receives a declaration that the SPSE has initiated the process of writing the reset command to the electric circuit. The device may of course also be configured to include both a declaration that the SPSE has initiated the process of writing the reset command to the electric circuit and a declaration that the SPSE has checked that the reset command has been received by the electric circuit. If the former is present in the attestation report but the latter is missing one may deduce that there is some kind of problem, possibly attacker related, in the transfer of the reset command from the SPSE to the electric circuit.

The device, in which the method is implemented, may be configured to send the confirmation via the network before the reset to factory default settings has been carried out. For example, once the SPSE has initiated the process of writing the reset command to the electric circuit the confirmation may be sent, including a declaration in the attestation report that the SPSE has initiated the process of writing the reset command to the electric circuit. In another example, once the SPSE has checked that a reset command has been received by the electric circuit the confirmation may be sent, including a declaration in the attestation report that the SPSE has checked that the reset command has been received by the electric circuit. The device may be configured to wait for a set time, e.g., 1 s or 100 ms, after the receipt of the reset command by the electric circuit, before initiating the reset process. Thus, the SPSE may have time to send the confirmation before the device powers down.

Sending the confirmation before the reset to factory default settings has been carried out may simplify the production of the response to the challenge by the SPSE, the device may then be implemented in a more cost-effective way. The request to reset the device to factory default settings may be received by the device together with the challenge associated with the request. If the confirmation is to be sent before the reset to factory default settings has been carried out, the challenge may still be in a working memory, e.g., a volatile memory, of the SPSE such that the response to the challenge may be produced from the content of the working memory of the SPSE. In contrast, if the confirmation is to be sent after the reset to factory default settings has been carried out, the erasing of the working memory of the SPSE may need to be accounted for. Doing this may be associated with an increased cost, e.g., in terms of a non-volatile memory configured to store the challenge securely.

The method may comprise:
  checking, by the SPSE, that the factory default reset has been carried out;
  including, by the SPSE, a declaration in the attestation report that the SPSE has checked that the factory default reset has been carried out.

Such a declaration may be considered to prove that the factory default reset has been carried out. The probability that the device is reset to its factory default settings may be considered higher when the remote unit receives a declaration that the SPSE has checked that the factory default reset has been carried out than if the remote unit receives a declaration that the SPSE has checked that the reset command has been received by the electric circuit. In the case of the attestation report including a declaration that the SPSE has checked that the factory default reset has been carried out there may be at least three alternative ways of handling the challenge.

According to the first alternative way of handling the challenge: the challenge may be received via the network at the SPSE of the device, after the reset to factory default settings has been carried out and the method may further comprise:
  awaiting, by the SPSE of the device, the challenge via the network after the reset to factory default settings has been carried out;
  wherein the sending of the confirmation is initiated after the receipt of the challenge via the network and after the reset to factory default settings has been carried out.

Consequently, a time line of events of the method may be:
SPSE receiving the request to reset the device to factory default settings;
SPSE initiating the reset to factory default settings of the device;
the reset to factory default settings being carried out, which may include the power of the device being turned off and on again;
SPSE awaiting and receiving the challenge associated with the request;
SPSE sending the confirmation including the attestation report.

In accordance with the above time line of events, there may be no power cut related to the reset to factory default settings between SPSE receiving the challenge and the SPSE sending the confirmation.

According to the second alternative way of handling the challenge: the challenge via the network may be received before the reset to factory default settings has been carried out and the method may further comprise:
  forwarding, by the SPSE of the device, the challenge received via the network to the electric circuit before the reset to factory default settings has been carried out;
  receiving, by the SPSE of the device, the challenge from the electric circuit after the reset to factory default settings has been carried out;
  wherein the sending of the confirmation is initiated after the receipt of the challenge from the electric circuit and after the reset to factory default settings has been carried out.

Consequently, a time line of events of the method may be:
SPSE receiving, via the network, the request to reset the device to factory default settings and the challenge associated with the request;
SPSE forwarding the challenge received to the electric circuit;
SPSE initiating the reset to factory default settings of the device;
the reset to factory default settings being carried out, which may include the power of parts of the device, e.g., parts including the first circuit, being turned off and on again;
SPSE receiving the challenge from the electric circuit;
SPSE sending the confirmation including the attestation report.

In accordance with the above time line of events, there may be a power cut related to the reset to factory default settings between the SPSE receiving the challenge via the network and the SPSE sending the confirmation. During the power cut, the challenge may be stored in the electric circuit. The challenge may be stored in a volatile memory of the electric circuit. The electric circuit may herein be powered separately from the rest of the device, wherein the power of the electric circuit may be kept on during factory default reset of the device such that the volatile memory of the electric circuit, with the stored challenge, is valid when the SPSE receives the challenge from the electric circuit. Alternatively, the challenge may be stored in a non-volatile memory of the electric circuit.

According to the third alternative way of handling the challenge: the challenge via the network may be received before the reset to factory default settings has been carried out and the method may further comprise:
  storing, by the SPSE of the device, the challenge received via the network, the challenge being stored in a non-volatile memory of the SPSE, the challenge being stored before the reset to factory default settings has been carried out;
  retrieving, by the SPSE of the device, the stored challenge from the non-volatile memory, the challenge being retrieved after the reset to factory default settings has been carried out;
wherein the sending of the confirmation is initiated after the retrieving of the challenge from the non-volatile memory and after the reset to factory default settings has been carried out.

Consequently, a time line of events of the method may be:
SPSE receiving, via the network, the request to reset the device to factory default settings and the challenge associated with the request;
SPSE storing the challenge in the non-volatile memory;
SPSE initiating the reset to factory default settings of the device;
the reset to factory default settings being carried out, which may include the power of parts of the device e.g., parts including the first circuit, being turned off and on again;
SPSE retrieving the challenge from the non-volatile memory;

SPSE sending the confirmation including the attestation report.

In accordance with the above time line of events, there may be a power cut related to the reset to factory default settings between the SPSE receiving the challenge via the network and the SPSE sending the confirmation. During the power cut the challenge may be stored in the non-volatile memory of the SPSE.

The above three alternative ways of handling the challenge all have their individual advantages. For example, in the first alternative the absence of a power cut between the SPSE receiving the challenge via the network and the SPSE sending the confirmation may facilitate a cheap implementation of the device, no non-volatile memory may be required for storing the challenge. The second and third alternatives facilitates receipt of the request to reset the device to factory default settings and the challenge associated with the request in the same message. This may increase the security of the operation of remotely resetting the device. Storing the challenge in a non-volatile memory of the SPSE may be the more secure than storing it elsewhere on the device.

The response to the challenge, as produced by the SPSE, may be the challenge in itself. By including the challenge, as it was received, in the confirmation, the SPSE may ensure that the confirmation is trusted as a current confirmation. Thereby, it may be assumed that the confirmation is not a replay of an old confirmation.

The method may comprise: determining the response to the challenge through a function stored in the SPSE.

The function stored in the SPSE may be an identify function, the identify function simply returning the challenge as it was received. Alternatively, the function stored in the SPSE may be a function taking the challenge as input, wherein the output of the function is different from the input.

By storing the function in the SPSE the function may be protected from being accessed by an attacker Thus, even if the rest of the device is under the control of the attacker, the attacker may not be able to determine the response to the challenge. The function may be configured such that it is computationally easy to calculate the response from the challenge but computationally difficult to calculate the challenge from the response. The function may be configured such that the probability of two slightly different challenges having the same response is low. The function may be a hash function configured to determine the response as a hash value, the hash value having a fixed-size.

The function may be a cryptographic function such as a cryptographic hash function. The input to the cryptographic hash function may comprise a message, e.g., any part of the confirmation or the entire confirmation, e.g., the attestation report or the attestation report together with an identifier and/or a time. The input to the cryptographic hash function may further comprise the challenge. The SPSE may store a cryptographic key which determines how the cryptographic function converts input to output. Thus, the SPSE may determine the response, based on an input of the challenge and the message, using the cryptographic hash function and the cryptographic key. Alternatively, the function may use the challenge as a cryptographic key to determine the response, based on the message as input to the function, whereby the function may be termed a keyed hash function. The keyed hash function may be a keyed-hash message authentication code (HMAC).

The function does not necessarily need to be a cryptographic hash function. The function may be any cryptographic function. The function may alternatively be a non-cryptographic function.

The method may comprise:
digitally signing, by the SPSE, the attestation report using an attestation key, the attestation key being a cryptographic key stored in the SPSE.

The attestation key may be a cryptographic key which is only used for digitally signing attestation reports.

Digitally signing of the attestation report enables the remote unit to authenticate the attestation report. The remote unit may thereby verify, with a high level of certainty, that the attestation report is valid and not produced by the attacker.

The SPSE may digitally sign several parts of the attestation report. For example, the attestation report may be a list of declarations, e.g., two or more of: a declaration in that the SPSE has initiated a process of writing a reset command; a declaration that the SPSE has checked that the reset command has been received; a declaration that the SPSE has checked that the factory default reset has been carried out. In this case every declaration may be digitally signed.

The confirmation may be digitally signed by the SPSE. The confirmation may be digitally signed by the SPSE using a confirmation key, the confirmation key being a cryptographic key stored in the SPSE. The SPSE may, by digitally signing the confirmation, certify that the entire confirmation is authentic. This enables the remote unit to authenticate the entire confirmation. The remote unit may thereby verify with a high level of certainty that the confirmation, in its entirety, is valid and not produced by the attacker.

The confirmation may consequently comprise one or more digital signatures for the attestation report and one digital signature for the confirmation as a whole. Alternatively, the confirmation may comprise one or more digital signatures for the attestation report and no digital signature for the confirmation as a whole.

Digitally signing an entity, the entity being e.g., a declaration of an attestation report; an attestation report; or a confirmation, may mean inputting the entity into a cryptographic function as a message. Using a cryptographic key, e.g., the attestation key or the confirmation key, the cryptographic function may then convert the message into a signature which is outputted.

Digitally signing an entity may further mean inputting both the entity and a timestamp into a cryptographic function as a message and use a cryptographic key, e.g., the attestation key or the confirmation key, to generate the signature as an output. Thus, the signature may be used to authenticate when, according to a clock of the device, the digital signing took place.

An attestation key used by the SPSE for digitally signing an attestation report, or a declaration of an attestation report, may be a private key. The remote unit may then use a public key, associated with the attestation key, for the authentication of the attestation report.

A confirmation key used by the SPSE for digitally signing a confirmation may be a private key. The remote unit may then use a public key, associated with the confirmation key, for the authentication of the confirmation.

When an entity is digitally signed, the entity may be sent, e.g., in plain text, via the network together with the digital signature.

According to a second aspect, there is provided a device comprising an electric circuit adapted to carry out a factory default reset of the device and a secure processing and storage environment, SPSE, the SPSE being configured for communicating with at least one remote unit via a network, and for communicating with the electric circuit via a communication channel, wherein the SPSE includes circuitry configured to:

receive a request to reset the device to factory default settings and a challenge associated with the request, wherein the request and the challenge are received via the network;

initiate a reset to factory default settings of the device by communicating with the electric circuit via the communication channel; and send a confirmation via the network, wherein the confirmation includes a response to the challenge as produced by the SPSE and an attestation report, the attestation report being a declaration by the SPSE that the reset to factory default settings is initiated or carried out.

The second aspect may generally have the same features and advantages as the first aspect. It is further noted that the concepts described herein relate to all possible combinations of features unless explicitly stated otherwise.

The device may be a network video camera. The device may alternatively be a radar unit. The device may alternatively be a door station.

The SPSE of the device may be a secure element or a trusted platform module.

As discussed in conjunction with the first aspect: The SPSE may have enhanced security compared to the rest of the device. The SPSE may comprise curtained memory that defines the behavior of the SPSE, wherein the curtained memory is shielded from influence from entities outside the SPSE. The SPSE may comprise a cryptographic key, wherein the SPSE is configured to perform secure transactions on the request of a remote unit with knowledge of the key. The secure transactions may be stored in the curtained memory. The SPSE may be one or more dedicated chips. Alternatively, The SPSE may be part of a chip wherein the rest of the chip has a lower or no security enhancement. Alternatively, the SPSE may be a piece of software that run in a trusted execution environment of the device.

The device may comprise a power source configured to power the electric circuit separately from the rest of the device and to be kept on during factory default reset of the device.

A separate power source for the electric circuit may enable the electric circuit to turn the power of the rest of the device off and on again. With a separate power source for the electric circuit, the electric circuit may store information during the power cut of the rest of the device. For example, if a state of a register in the electric circuit has been set to trigger the reset to factory default settings when the power to the rest of the device is turned on, that state may be stored throughout the power cut of the rest of the device and the state may still be valid when the rest of the device is powered on again. Other information may also be stored in the electric circuit during the power cut of the rest of the device if the electric circuit has a separate power source. Such other information may be the challenge.

The power source configured to power the electric circuit separately from the rest of the device may be a power source configured to always be on. Alternatively, it may be configured to supply power to the electric circuit for a time period after the power to the rest of the device has been cut. For example, a capacitor or battery may supply power to the electric circuit when the power to the rest of the device has been cut. The capacitor or battery may be dimensioned such that it is able to sustain the electric circuit until the power comes on again.

The device may alternatively, comprise a power source configured to power the electric circuit and the SPSE separately from parts of the device that are powered off during the factory default reset. The power source configured to power the electric circuit and the SPSE may then be kept on during factory default reset of the device.

BRIEF DESCRIPTION OF THE DRAWINGS

The above, as well as additional objects, features and advantages of the present concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description are described hereinafter according to a preferable embodiment, being not used to limit the claimed scope. The embodiments may be in many different forms and should not be construed as limited to the embodiments set forth herein; rather, these embodiments are provided for thoroughness and completeness, and fully convey the scope of the claims to the skilled person.

Figure 1:
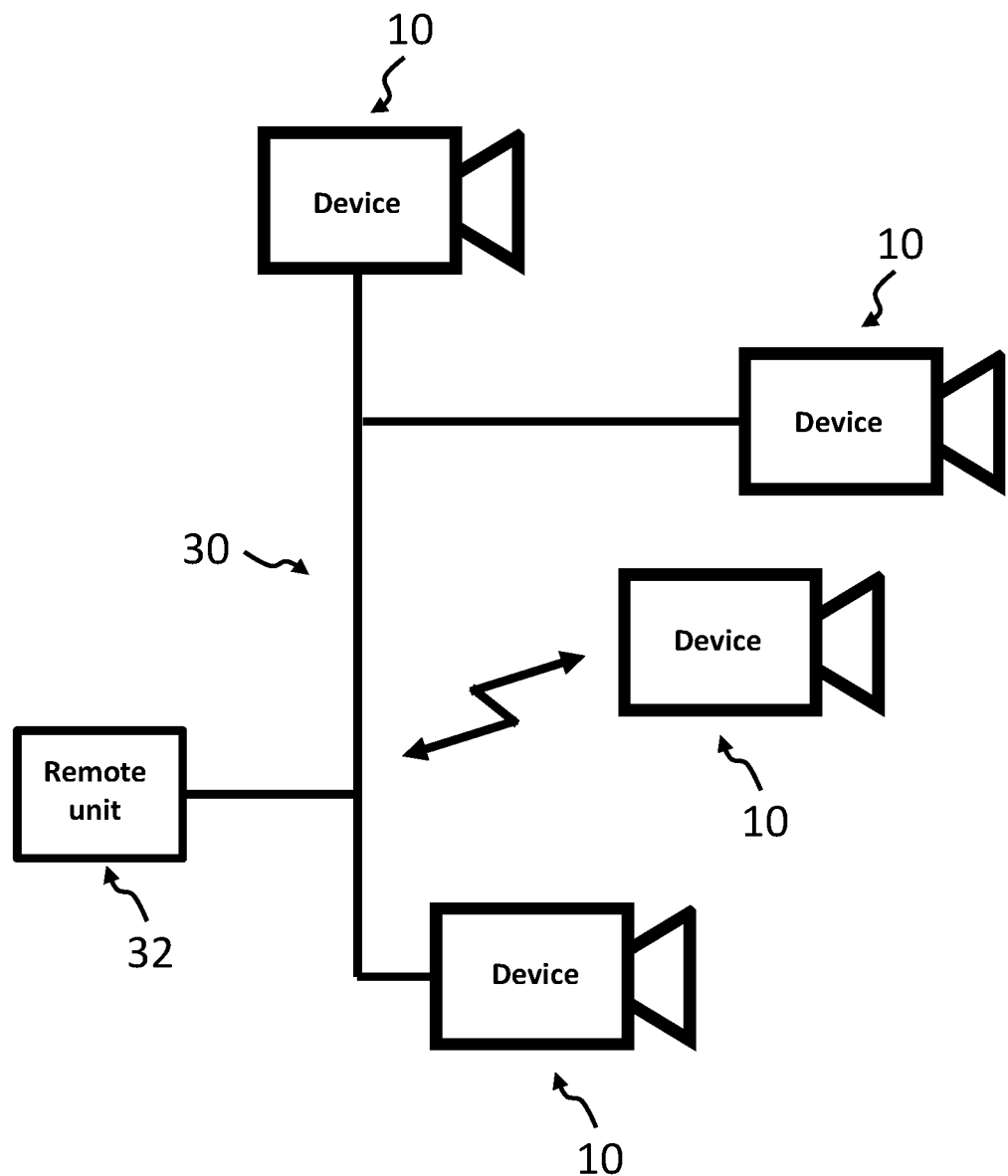
FIG. 1 illustrates devices connected to a network.

FIG. 1 illustrates devices 10, in this case network video cameras, connected to a network 30. There may be one or more devices 10 connected to the network 30. In FIG. 1 there is also a remote unit 32 connected to the network 30. The remote unit 32 may be e.g., a computer or server controlling one or more devices 10. Connections between entities of the network 30 may be wired, wireless, or a combination of wired and wireless connections, as illustrated in FIG. 1. The devices 10 may be reset to factory default settings based on a request from the remote unit 32.

Figure 2:
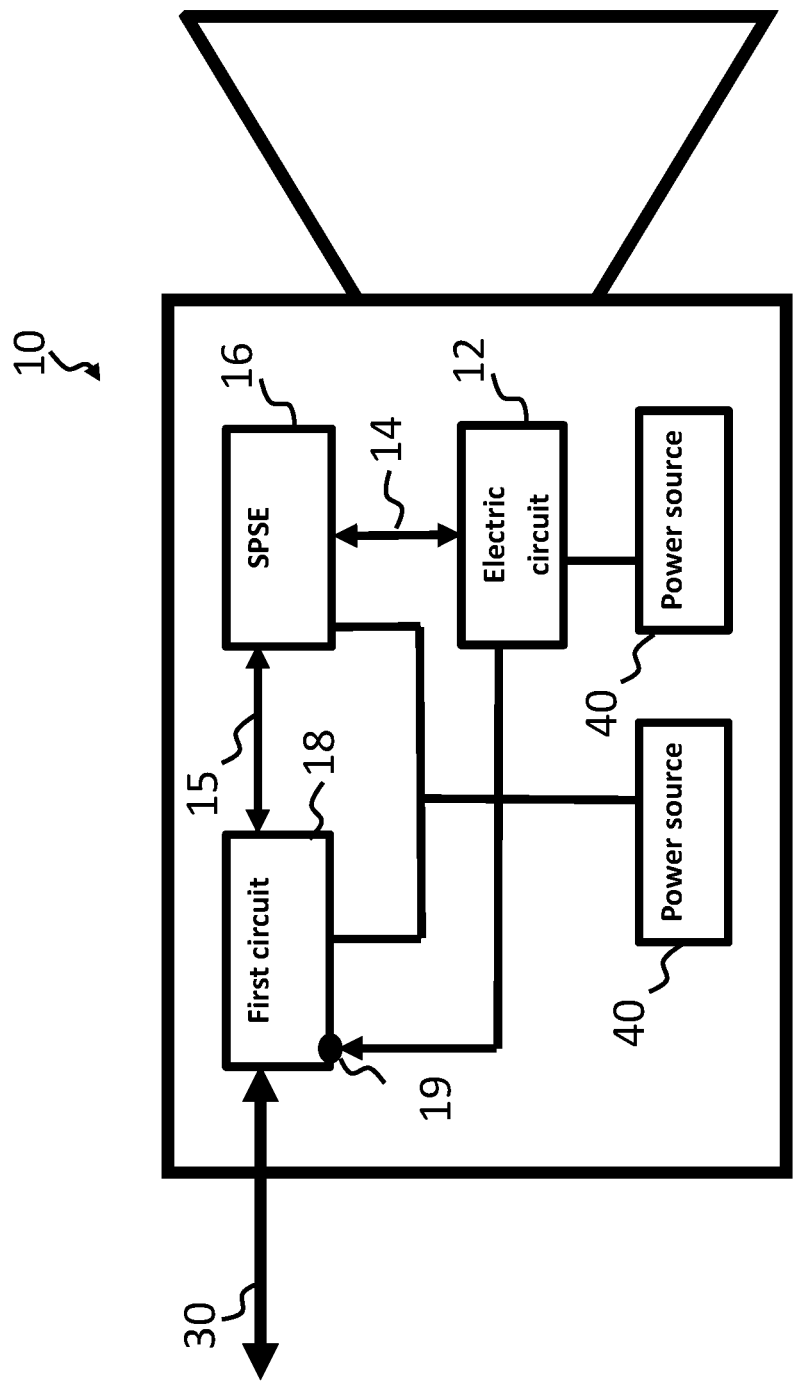
FIG. 2 illustrates a device.

FIG. 2 illustrates a device 10, such as one of the devices of FIG. 1. The device 10 comprises a secure processing and storage environment, SPSE, 16, and an electric circuit 12. The SPSE 16 is configured for communicating with at least one remote unit 32 via the network 30, and for communicating with the electric circuit 12 via a communication channel 14.

The electric circuit 12 is adapted to carry out a factory default reset of the device 10. The electric circuit 12 may be configured to solely carry out the factory default reset of the device 10 and tasks associated with the factory default reset of the device 10. The electric circuit 12 may be configured to only act on commands from the SPSE 16, e.g., by only receiving input from the SPSE 16. In this case, if the SPSE 16 sends a reset command to the electric circuit 12 it may be impossible for malware that has infected other parts of the device 10 to stop the factory default reset from being carried out. The electric circuit 12 may be a micro controller unit.

The SPSE 16 includes circuitry configured to receive a request to reset the device 10 to factory default settings and a challenge associated with the request, wherein the request and the challenge are received via the network 30. The request and challenge may come from a remote unit 32. The circuitry of the SPSE 16 is further configured to initiate a reset to factory default settings of the device 10 by communicating with the electric circuit 12 via the communication channel 14; and send a confirmation via the network 30, wherein the confirmation includes a response to the challenge as produced by the SPSE 16 and an attestation report, the attestation report being a declaration by the SPSE 16 that the reset to factory default settings is initiated or carried out. The confirmation may be one message or more than one message. For example, the response and the attestation report may be sent as separate messages. In this case the response may be based not only on the challenge but also on the attestation report, such that the response is linked to the attestation report.

The SPSE 16 may be a secure element. The SPSE 16 may be a TPM. The SPSE 16 may have enhanced security compared to the rest of the device. The SPSE 16 may comprise at least one cryptographic key, wherein the SPSE 16 is configured to digitally sign information using one or more of the at least one cryptographic key. The SPSE 16 will in the following mainly be discussed as a TPM, by way of example. However, it should be understood that alternative implementations of the SPSE 16 are also possible.

The device 10 may additionally comprise a first circuit 18. The first circuit 18 may be a part of the device 10 which is has a lower security enhancement than the SPSE 16 or no security enhancement. The first circuit may e.g., be a system on a chip or a motherboard. The first circuit 18 may be configured to perform core tasks of the device 10. In the case of the device 10 being a network video camera the first circuit may be configured to record and process video. The first circuit 18 may be configured to boot the device 10 when the device 10 is turned on. The first circuit 18 may have an input pin 19. Based on a value of the input pin 19 the first circuit 18 may boot into the state the device 10 was in the last time it was turned off or into a state of factory default settings.

The SPSE 16 may be a unit separate from the first circuit 18. For example, the SPSE 16 may be a discrete TPM separated from the first circuit 18. The SPSE 16 may then communicate with the first circuit 18 via a second communication channel 15, as illustrated in FIG. 2. Alternatively, the SPSE 16 may be integrated in the first circuit 18, e.g., as an integrated TPM. For example, integrated in one of the components in the first circuit 18.

The SPSE 16 may be configured to communicate with at least one remote unit 32 via a network 30 through another part of the device 10, e.g., through a part of the device 10 which has a lower security enhancement than the SPSE 16. FIG. 2 illustrates the SPCE 16 communicating with a remote unit 32 through the first circuit 18, using the second communication channel 15. The SPSE may of course alternatively be connected directly to the network 30.

The communication channels 14,15 of the device 10 may be buses or wires.

The device 10 may additionally comprise one or more power sources 40. In FIG. 2 the device 10 comprises two power sources 40, wherein the electric circuit 12 is powered separately from the first circuit 18 and the SPSE 16.

Figure 3:
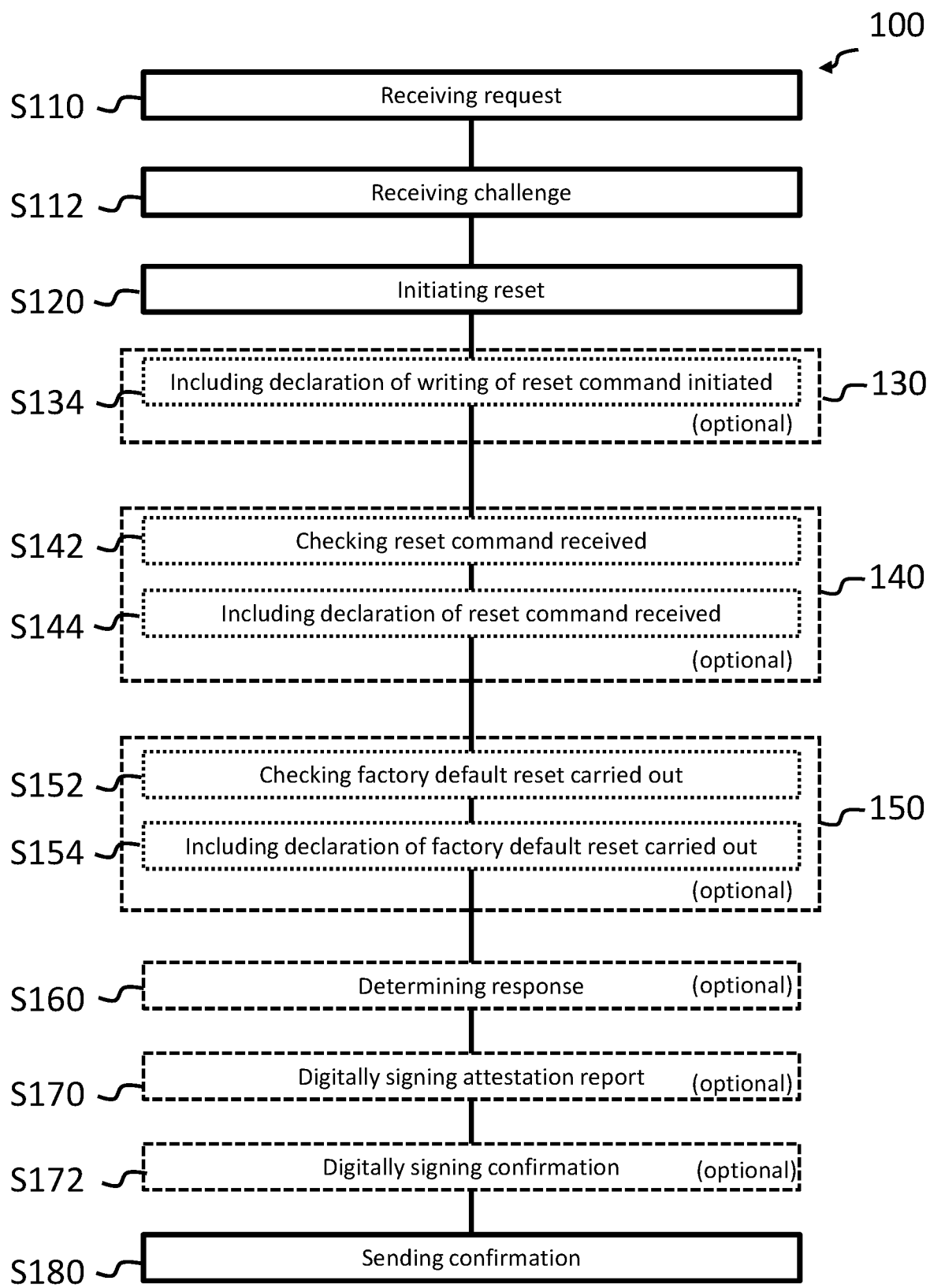
FIG. 3 illustrates a flowchart of a method for remote resetting of a device to factory default settings.

FIG. 3 illustrates a flowchart of a method 100 for remote resetting of a device 10, e.g., the device 10 described in conjunction with FIG. 2, to factory default settings. The method 100 may be performed in the order indicated in the figure, from top to bottom. However, other orders are also possible. As indicated, some steps in FIG. 3 are optional.

According to the method 100 a request to reset the device 10 to factory default settings is received S110 at the SPSE 16 via the network 30. Further, a challenge associated with the request is received S112 at the SPSE 16 via the network 30. The request and the challenge may be received together as one message. However, they may also be received separately. Further, according to the method 100, a reset to factory default settings of the device 10 is initiated S120 by the SPSE 16 by communicating with the electric circuit 12 via the communication channel 14.

The challenge may be associated with the request by being received as one message. If the request and the challenge are received as separate messages they may be associated in another way. For example, the messages may comprise a message identifier. If both the message carrying the request and the message carrying the challenge have the same message identifier the request and the challenge may be considered to be associated. Alternatively, the request and the challenge may be considered to be associated if they both arrive within a certain time period.

The challenge may be a number, e.g., a random number or a pseudo-random number. The challenge may be a cryptographic nonce, i.e., a number used only once in the communication with the device 10.

A device 10 such as the one illustrated in FIG. 2 may receive S110, S112 the request and/or the challenge formatted according to the APDU-protocol. The SPSE 16 may then read and parse the request. The SPSE 16 may then initiate S120 the reset to factory default settings e.g., by writing a reset command to the electric circuit 12 via the communication channel 14, the reset command being a command prompting the electric circuit 12 to carry out the factory default reset. The reset command written to the electric circuit 12 may be in the I2C format.

Further, according to the method 100, a confirmation is sent S180 via the network 30, wherein the confirmation includes a response to the challenge as produced by the SPSE 16 and an attestation report, the attestation report being a declaration by the SPSE 16 that the reset to factory default settings is initiated or carried out. The confirmation may or may not be encrypted. If the confirmation is encrypted, it may be encrypted using a cryptographic key stored in the SPSE 16.

In one example of a confirmation produced by the SPSE 16, the confirmation comprises:
 a confirmation text;
 a timestamp associated with the confirmation, e.g., relating to when the confirmation was produced by the SPSE 16; and
 a confirmation signature.

The confirmation signature may herein be a signature from any known public key cryptographic system. The confirmation signature may be produced by inputting the confirmation text and the timestamp associated with the confirmation into a cryptographic function. The cryptographic function may use a confirmation key stored in the SPSE 16, the confirmation key being a private cryptographic key, to produce the confirmation signature based on the confirmation text and the timestamp associated with the confirmation. In order for a remote unit 32 to authenticate the confirmation the remote unit 32 may input the confirmation text of the confirmation and the timestamp associated with the confirmation into a cryptographic function and using a public key receive an output which may be compared to the confirmation signature. If these match, the confirmation may be considered authenticated.

Further, the confirmation text may comprise:
the response to the challenge;
an identifier;
the attestation report.

The response to the challenge may herein be the challenge itself, e.g., as produced by an identify function. The identifier may be an ID or serial number of the device.

The attestation report may comprise:
a declaration;
a timestamp associated with the declaration, e.g., relating to when the declaration was produced by the SPSE; and
an attestation signature.

The attestation signature may herein be a signature from any known public key cryptographic system. The attestation signature may be produced by inputting the declaration and the timestamp associated with the declaration into a cryptographic function. The cryptographic function may use an attestation key stored in the SPSE 16, the attestation key being a private cryptographic key, to produce the attestation signature based on the declaration and the timestamp associated with the declaration. In order for a remote unit 32 to authenticate the attestation report, the remote unit 32 may input the declaration of attestation report and the timestamp associated with the declaration into a cryptographic function and using a public key receive an output which may be compared to the attestation signature. If these match, the declaration of the attestation report may be considered authenticated.

The attestation report may comprise several declarations, each with a timestamp and an attestation signature. Alternatively, the entire attestation report, possibly including several declarations, may be digitally signed with one single timestamp and attestation signature.

In the above example, both the attestation report and the confirmation as a whole are digitally signed. This may ensure a high level of security. An alternative approach could be to not digitally sign the confirmation as a whole and only digitally sign the attestation report. In this case, it may be desirable to create a link between the SPSE 16 and the response to the challenge in some other way. For example, the response to the challenge may be produced using a cryptographic function stored in the SPSE 16. In another example, the response to the challenge may be included in the attestation report, whereby the response to the challenge may be authenticated through the authentication of the attestation report.

In line with the example of a confirmation produced by the SPSE 16: The attestation report may in an optional step of the method 100 be digitally signed S170 by the SPSE 16 using an attestation key, the attestation key being a cryptographic key stored in the SPSE 16. Further, the confirmation may in an optional step of the method 100 be digitally signed S172 by the SPSE 16. Further, the response to the challenge may in an optional step of the method 100 be determined S160 through a function stored in the SPSE 16. The attestation report may be created in many different ways. In the following three different types of attestation reports will be described: write attestation 130, read attestation 140, and outcome attestation 150. The optional steps of creating the three different types of attestation reports are marked in FIG. 3.

Write attestation 130 may be performed by:
including S134, by the SPSE 16, a declaration in the attestation report that the SPSE 16 has initiated a process of writing a reset command to the electric circuit 12 via the communication channel 14, the reset command being a command prompting the electric circuit 12 to carry out the factory default reset. For example, in response to the request, the SPSE 16 may write a reset command to the electric circuit. The command may be an i2c write command. The reset command may be seen as an instruction to the electric circuit 12 to set a state of a register or a capacitor to a certain value. The SPSE 16 may, when this has been executed, include a declaration comprising the write command into the attestation report together with a timestamp of when execution was carried out and an attestation signature. The electric circuit 12 may react on the reset command, e.g., by changing a state of a register or setting the state of a capacitor, e.g., to a high level. The state of the register or capacitor may define whether a reset to factory default settings should be made the next time the device 10 is powered off and on.

Read attestation 140 may be performed by:
checking S142, by the SPSE 16, that a reset command has been received by the electric circuit 12, the reset command being a command prompting the electric circuit 12 to carry out the factory default reset, the reset command being a command written by the SPSE 16 to the electric circuit 12 via the communication channel 14;
including S144, by the SPSE 16, a declaration in the attestation report that the SPSE 16 has checked that the reset command has been received by the electric circuit 12.

For example, the SPSE 16 may carry out a read command to read the state of the register or the state of the capacitor of the electric circuit. By doing this the SPSE 16 may check that the electric circuit 12 has received and acted on the reset command. The read command may be an i2c read command. When the read command has been executed the SPSE 16 may include a declaration comprising the read command and the value of the register or the capacitor into the attestation report together with a timestamp of when execution was carried out and an attestation signature.

When a write 130 or read 140 attestation is performed the attestation report may be sent before or after the factory default reset has been carried out.

Outcome attestation 150 may be performed by:
checking S152, by the SPSE 16, that the factory default reset has been carried out;
including S154, by the SPSE 16, a declaration in the attestation report that the SPSE 16 has checked that the factory default reset has been carried out.

For example, the electric circuit 12 may after receiving the reset command and setting the state of the register or capacitor, to define that a reset to factory default settings should be made the next time the device 10 is powered on, proceed by turning the power to the first circuit 18 and the SPSE 16 off and on again, e.g., by turning a power source 40 that is separate from the power source 40 of the electric circuit 12 off and on again. As the power to the device 10 comes on, the device 10 or the first circuit 18 of the device 10 may boot into the state of factory default settings. Booting into the state of factory default settings may be based on the value of an input pin 19, the value of the input pin 19 being defined by the register or capacitor of the electric circuit 12. As part of the boot process the SPSE 16 may execute a read command to read the state of the register or the state of the capacitor of the electric circuit 12. By doing this the SPSE 16 may check that the that the factory default reset has been carried out. If the register or the capacitor voltage has the value that prompts the reset during the boot process it may be concluded that the reset has taken place. The read command may be an i2c read command. When the read command has been executed the SPSE 16 may include a declaration comprising the read command and the value of the register or the capacitor into the attestation report together with a timestamp of when execution was carried out and an attestation signature. The declaration may further comprise information that indicates that the register was read during the boot process, such that the outcome attestation may be separated from the read attestation. Alternatively, the timestamp may indicate that the declaration is a declaration of an outcome attestation. The attestation report may be one of the three above attestation types. However, the attestation report may alternatively be a combination of any of the three types. For example, the attestation report may comprise both a write attestation 130 and a read attestation 140 by including both one declaration corresponding to write attestation 130 and one declaration corresponding to read attestation 140 in the attestation report.

As previously mentioned there may be at least three different ways of handling the challenge. The three different ways of handling the challenge are applicable especially when an outcome attestation 150 is performed. However, they may also be applicable for write 130 and read 140 attestation.

Figure 4:
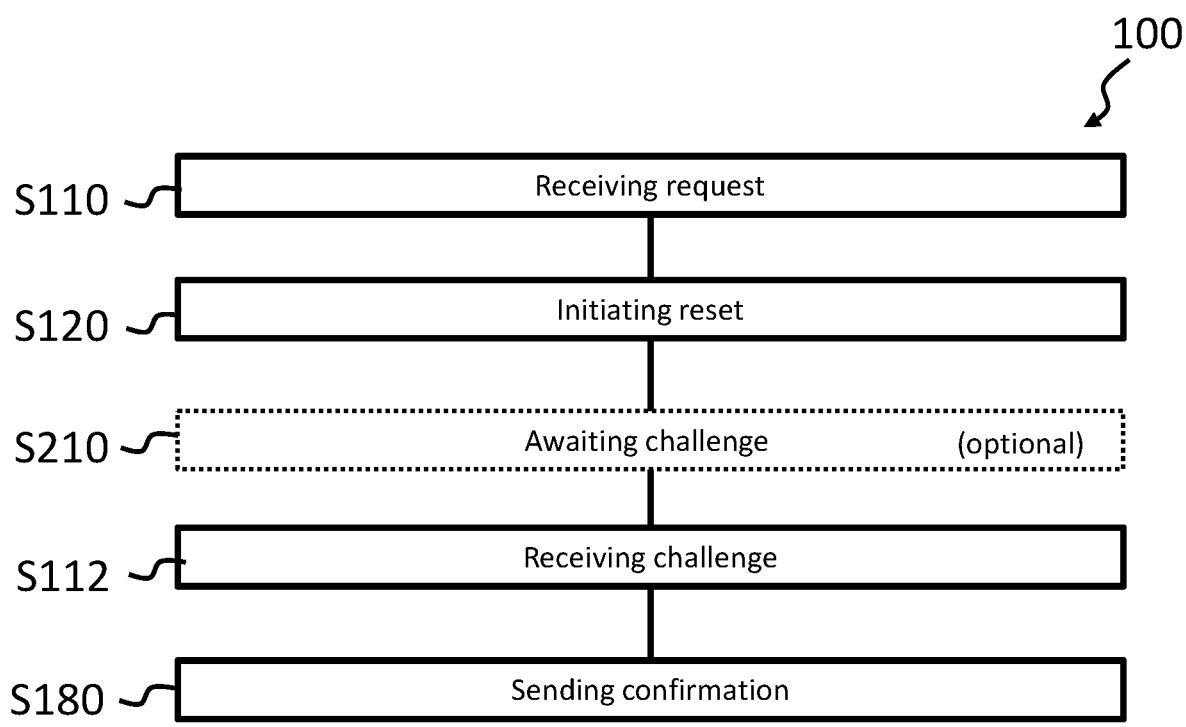
FIG. 4 illustrates a flowchart of a method for remote resetting of a device to factory default settings.

FIG. 4 illustrates what the method 100 may look like according to the first alternative way of handling the challenge. The method 100 may be performed in the order indicated in the figure, from top to bottom. The method 100 of FIG. 4 may be combined with one or more of the optional steps of FIG. 3. The method 100, as described in FIG. 4, may comprise the step of:

Awaiting S210, by the SPSE 16 of the device 10, the challenge via the network 30 after the reset to factory default settings has been carried out.

For example, the SPSE 16 may be configured to wait for the challenge for a certain time after the SPSE 16 has been powered on or for a certain time after the first circuit 18 has been powered on. Once the challenge arrives the response may be determined, and the confirmation completed and sent.

Figure 5:
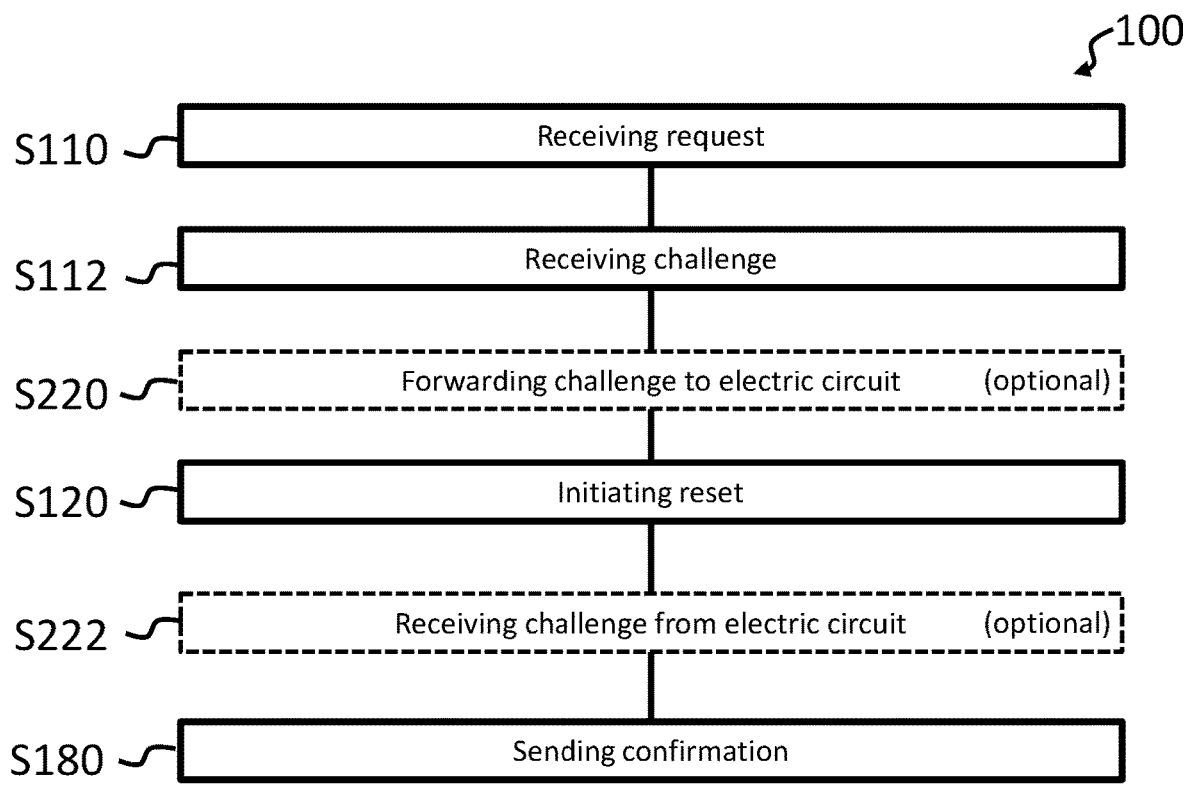
FIG. 5 illustrates a flowchart of a method for remote resetting of a device to factory default settings.

FIG. 5 illustrates what the method 100 may look like according to the second alternative way of handling the challenge. The method 100 may be performed in the order indicated in the figure, from top to bottom. The method 100 of FIG. 5 may be combined with one or more of the optional steps of FIG. 3. The method 100, as described in FIG. 5, may comprise the steps of:

Forwarding S220, by the SPSE 16 of the device 10, the challenge received via the network 30 to the electric circuit 12 before the reset to factory default settings has been carried out; and receiving S222, by the SPSE 16 of the device 10, the challenge from the electric circuit 12 after the reset to factory default settings has been carried out.

For example, the SPSE 16 may be configured such that if the challenge is received S110, via the network 30, before the reset to factory default settings has been carried out, e.g., in the same message as the request, the SPSE 16 forwards the challenge to the electric circuit 12. If the SPSE 16 is powered off and on again during the factory default reset, the challenge may be stored during this time in the electric circuit 12. The challenge may be stored in a volatile or non-volatile memory, depending on whether the electric circuit 12 is powered. Once the power to the SPSE 16 comes on again it may receive S222 the challenge from the electric circuit 12, e.g., by reading the challenge from the electric circuit 12. Once the challenge is received S222, the response may be determined, and the confirmation completed and sent.

Figure 6:
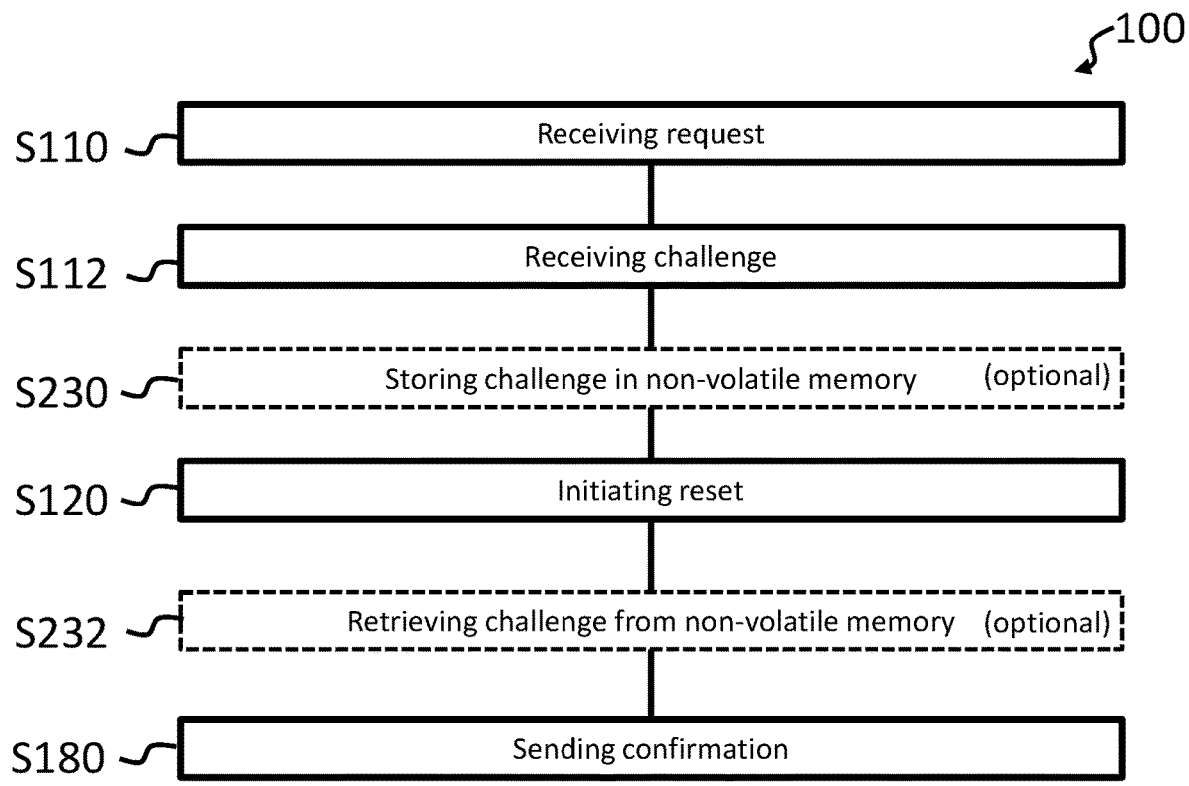
FIG. 6 illustrates a flowchart of a method for remote resetting of a device to factory default settings.

FIG. 6 illustrates what the method 100 may look like according to the third alternative way of handling the challenge. The method 100 may be performed in the order indicated in the figure, from top to bottom. The method 100 of FIG. 6 may be combined with one or more of the optional steps of FIG. 3. The method 100, as described in FIG. 6, may comprise the steps of:

Storing S230, by the SPSE 16 of the device 10, the challenge received via the network 30, the challenge being stored in a non-volatile memory of the SPSE 16, the challenge being stored before the reset to factory default settings has been carried out; and retrieving S232, by the SPSE 16 of the device 10, the stored challenge from the non-volatile memory, the challenge being retrieved after the reset to factory default settings has been carried out.

For example, the SPSE 16 may be configured such that if the challenge is received S110, via the network 30, before the reset to factory default settings has been carried out, e.g., in the same message as the request, the SPSE 16 stores S230 the challenge in a non-volatile memory of the SPSE 16. If the SPSE 16 is powered off and on again during the factory default reset, the challenge may be stored during this time in the non-volatile memory of the SPSE 16. Once the power to the SPSE 16 comes on again, it may retrieve S232 the challenge from the non-volatile memory of the SPSE 16. Once the challenge is retrieved S232, the response may be determined, and the confirmation completed and sent.

In the above, the concepts have mainly been described with reference to a limited number of examples. However, as is readily appreciated by a person skilled in the art, other examples than the ones disclosed above are equally possible within the scope of the concepts, as defined by the appended claims.

The invention claimed is:

1. A method, implemented in a device, for securely initiating and confirming remote resetting of the device to factory default settings, the device comprising an electric circuit adapted to carry out the factory default reset and a secure processing and storage environment, SPSE, the SPSE being configured for communicating with at least one remote unit via a network, and for communicating with the electric circuit via a communication channel, the method comprising:

receiving, at the SPSE, a current request originating remote from the unit to reset the device to factory default settings and a challenge associated with the current request, wherein the current request and the challenge are received via the network;

after receiving the current request, initiating, by the SPSE, a reset to factory default settings of the device by communicating with the electric circuit via the communication channel;

determining a response to the challenge through a function stored in the SPSE, wherein the response to the challenge is associated with the current request, checking by the SPSE, that the factory default reset has been carried out; and sending, by the SPSE, a confirmation via the network, wherein the confirmation includes the response to the challenge as produced by the SPSE and an attestation report, the attestation report being a declaration by the SPSE that the SPSE has checked that the factory default reset has been carried out.

2. The method of claim 1, wherein the challenge via the network is received, at the SPSE of the device, after the reset to factory default settings has been carried out, the method further comprising:
   awaiting, by the SPSE of the device, the challenge via the network after the reset to factory default settings has been carried out;
wherein the sending of the confirmation is initiated after the receipt of the challenge via the network and after the reset to factory default settings has been carried out.

3. The method of claim 1, wherein the challenge via the network is received before the reset to factory default settings has been carried out, the method further comprising:
   forwarding, by the SPSE of the device, the challenge received via the network to the electric circuit before the reset to factory default settings has been carried out;
   receiving, by the SPSE of the device, the challenge from the electric circuit after the reset to factory default settings has been carried out;
wherein the sending of the confirmation is initiated after the receipt of the challenge from the electric circuit and after the reset to factory default settings has been carried out.

4. The method of claim 1, wherein the challenge via the network is received before the reset to factory default settings has been carried out, the method further comprising:
   storing, by the SPSE of the device, the challenge received via the network, the challenge being stored in a non-volatile memory of the SPSE, the challenge being stored before the reset to factory default settings has been carried out;
   retrieving, by the SPSE of the device, the stored challenge from the non-volatile memory, the challenge being retrieved after the reset to factory default settings has been carried out;
wherein the sending of the confirmation is initiated after the retrieving of the challenge from the non-volatile memory and after the reset to factory default settings has been carried out.

5. The method of claim 1, the method further comprising:
   digitally signing, by the SPSE, the attestation report using an attestation key, the attestation key being a cryptographic key stored in the SPSE.

6. The method of claim 1, wherein the confirmation is digitally signed by the SPSE.

7. A device comprising an electric circuit adapted to carry out a remotely-initiated factory default reset of the device and a secure processing and storage environment, SPSE, the SPSE being configured for communicating with at least one remote unit via a network, and for communicating with the electric circuit via a communication channel,
   wherein the SPSE includes circuitry configured to:
   receive a current request to reset the device to factory default settings and a challenge associated with the current request, wherein the current request and the challenge are received via the network;
      after receiving the current request, initiate a reset to factory default settings of the device by communicating with the electric circuit via the communication channel;
      determine a response to the challenge through a function stored in the SPSE, wherein the response to the challenge is associated with the current request;
      check that the factory default reset has been carried out; and
      send a confirmation via the network, wherein the confirmation includes the response to the challenge as produced by the SPSE and an attestation report, the attestation report being a declaration by the SPSE that the SPSE has checked that the factory default reset has been carried out.

8. The device of claim 7, wherein the device is a network video camera.

9. The device of claim 7, wherein the SPSE is a secure element or a trusted platform module.

10. The device of claim 7, wherein the device comprises a power source configured to power the electric circuit separately from the rest of the device and to be kept on during factory default reset of the device.

11. A method for securely initiating and confirming remote resetting of a device to factory default settings, the device comprising an electric circuit adapted to carry out the factory default reset and a secure processing and storage environment, SPSE, the SPSE being configured for communicating with at least one remote unit via a network, and for communicating with the electric circuit via a communication channel, the method comprising:
   receiving, at the SPSE of the device, a current request originating remote from the unit to reset the device to factory default settings and a challenge associated with the current request, wherein the current request and the challenge are received via the network;
   after receiving the current request, initiating, by the SPSE of the device, a reset to factory default settings of the device by communicating with the electric circuit via the communication channel;
   determining a response to the challenge through a function stored in the SPSE of the device, wherein the response to the challenge is associated with the current request;
   checking by the SPSE of the device, that the factory default reset has been carried out;
   sending, by the SPSE of the device, a confirmation via the network to the remote unit, wherein the confirmation includes the response to the challenge as produced by the SPSE and an attestation report, the attestation report being a declaration by the SPSE that the SPSE has checked that the factory default reset has been carried out; and
   in response to a verification that no confirmation report is received by the remote unit or the response to the challenge is incorrect, indicating that the device may be corrupted by an attacker.

12. The method of claim 11, wherein the indicating is performed at the remote unit.

13. The method of claim 11, wherein the challenge via the network is received, at the SPSE of the device, after the reset to factory default settings has been carried out, the method further comprising:
   awaiting, by the SPSE of the device, the challenge via the network after the reset to factory default settings has been carried out;
wherein the sending of the confirmation is initiated after the receipt of the challenge via the network and after the reset to factory default settings has been carried out.

14. The method of claim 11, wherein the challenge via the network is received before the reset to factory default settings has been carried out, the method further comprising:
   forwarding, by the SPSE of the device, the challenge received via the network to the electric circuit before the reset to factory default settings has been carried out;
   receiving, by the SPSE of the device, the challenge from the electric circuit after the reset to factory default settings has been carried out;

wherein the sending of the confirmation is initiated after the receipt of the challenge from the electric circuit and after the reset to factory default settings has been carried out.

15. The method of claim 11, wherein the challenge via the network is received before the reset to factory default settings has been carried out, the method further comprising:
   storing, by the SPSE of the device, the challenge received via the network, the challenge being stored in a non-volatile memory of the SPSE, the challenge being stored before the reset to factory default settings has been carried out;
   retrieving, by the SPSE of the device, the stored challenge from the non-volatile memory, the challenge being retrieved after the reset to factory default settings has been carried out;
   wherein the sending of the confirmation is initiated after the retrieving of the challenge from the non-volatile memory and after the reset to factory default settings has been carried out.

16. The method of claim 11, the method further comprising:
   digitally signing, by the SPSE, the attestation report using an attestation key, the attestation key being a cryptographic key stored in the SPSE.

17. The method of claim 11, wherein the confirmation is digitally signed by the SPSE.

\* \* \* \* \*